United States Patent
Plum et al.

(10) Patent No.: US 11,674,550 B2
(45) Date of Patent: Jun. 13, 2023

(54) BEARING CAGE TREATED WITH PLASMA-NITRIDING

(71) Applicant: Schaeffler Technologies AG & Co. KG, Herzogenaurach (DE)

(72) Inventors: Roland Plum, Stratford (CA); Peter Glöckner, Schweinfurt (DE); Johannes Bedenk, Theres (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/506,374

(22) Filed: Oct. 20, 2021

(65) Prior Publication Data

US 2023/0118547 A1    Apr. 20, 2023

(51) Int. Cl.
*F16C 33/44* (2006.01)

(52) U.S. Cl.
CPC .......... *F16C 33/44* (2013.01); *F16C 2223/14* (2013.01)

(58) Field of Classification Search
CPC ........ F16C 33/44; F16C 33/445; F16C 33/56; F16C 33/565; F16C 2223/14
See application file for complete search history.

(56) References Cited

U.S. PATENT DOCUMENTS

| | | | |
|---|---|---|---|
| 5,443,663 A * | 8/1995 | Meletis | C23C 8/24 148/222 |
| 2013/0016937 A1 | 1/2013 | Tsutsui et al. | |

FOREIGN PATENT DOCUMENTS

| | | | |
|---|---|---|---|
| JP | 2002339982 | * | 11/2002 |
| JP | 2008-195994 A | | 8/2008 |
| JP | 2009-228897 A | | 10/2009 |
| JP | 2019-027476 A | | 2/2019 |

OTHER PUBLICATIONS

Translation of JP2002339982, published Nov. 2002, translation obtained Sep. 30, 2022.*
"Ion Nitriding of Titanium Aerospace & Armament Applications", Aerospace & Defense Magazine; Apr. 2, 2021 (8 Pages).
International Search Report and Written Opinion for International Application No. PCT/US2022/047103 dated Feb. 10, 2023, 10 pages long.

* cited by examiner

*Primary Examiner* — James Pilkington
(74) *Attorney, Agent, or Firm* — Volpe Koenig, P.C.

(57) ABSTRACT

A method of forming a bearing cage is generally disclosed herein. The method includes (i) forming a bearing cage from either titanium or a titanium alloy; and (ii) applying a plasma-nitriding treatment to at least one surface of the bearing cage to form a compound layer of titanium nitride including TiN and $Ti_2N$ on an outer region of the at least one surface. Step (ii) further forms a diffusion zone adjacent to the outer region, in one aspect. A surface hardness of the bearing cage that is treated by the plasma-nitriding step is at least 1000 HV. The bearing cage is configured to be used in a turbofan, turboprop, or turboshaft engine or in a helicopter gearbox, in one aspect.

16 Claims, 3 Drawing Sheets

BEARING CAGE TREATED WITH PLASMA-NITRIDING

FIELD OF INVENTION

The present disclosure relates to a bearing cage treated with plasma-nitriding.

BACKGROUND

Bearing assemblies used in the aerospace industry can include cages that are configured to support rolling elements. These cages are typically formed from steel. In one aspect, the cages can be silver plated to prevent fretting.

In other types of applications, the cages are formed from a non-metallic component, such as plastic, in order to reduce the weight of the cages. However, plastic has known drawbacks due to its relatively lower strength and resistance to heat.

In some aerospace applications, cages can be formed from titanium alloys due to titanium's strength and relatively higher heat resistance. However, these known alloys typically have poor friction and wear properties.

It would be desirable to provide a bearing cage that is lightweight but also exhibits sufficient resistance to wear and friction.

SUMMARY

A method of forming a bearing cage is generally disclosed herein. The method includes (i) forming a bearing cage from titanium or a titanium alloy; and (ii) applying a plasma-nitriding treatment to at least one surface of the bearing cage to form a compound layer of titanium nitride (TiN and $Ti_2N$) on an outer region of the at least one surface. Step (ii) further forms a diffusion zone adjacent to the outer layer, in one aspect. A surface hardness of the bearing cage that is treated by the plasma-nitriding step is at least 1000 HV.

The at least one surface of the bearing cage is configured to face or oppose a cage piloting surface of an adjacent bearing ring. In another aspect, the at least one surface is configured to support bearing elements of a bearing. The bearing cage can be configured to support spherical or cylindrical shaped rolling elements.

The bearing cage is configured for use in a turbofan engine or other aerospace-based application, in one aspect.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1A:
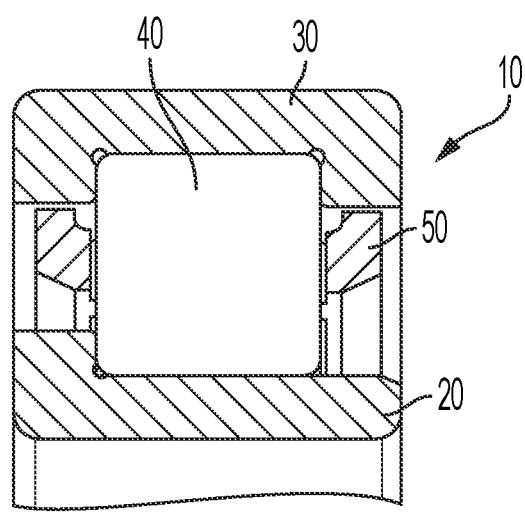
FIG. 1A illustrates a cross-sectional view of an exemplary bearing assembly.
Figure 1B:
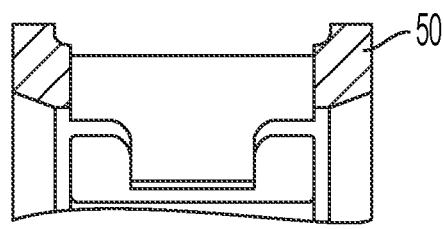
FIG. 1B illustrates a cross-sectional view of a bearing cage for the bearing assembly of FIG. 1A.
Figure 2A:
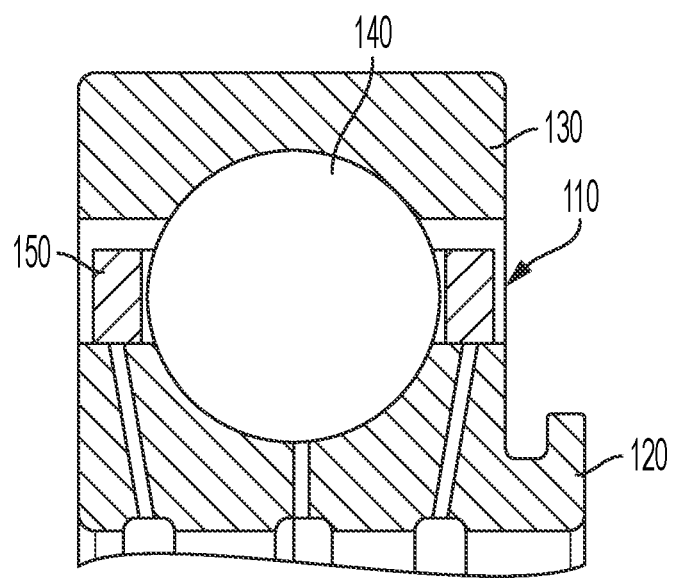
FIG. 2A illustrates a cross-sectional view of another exemplary bearing assembly.
Figure 2B:
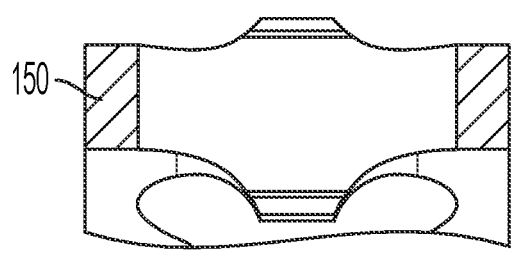
FIG. 2B illustrates a cross-sectional view of a bearing cage for the bearing assembly of FIG. 2A.

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

In one aspect, a bearing cage, such as bearing cage 50 or bearing cage 150 shown in FIGS. 1A, 1B, 2A, and 2B, is provided that is formed according to a specific method. The bearing cage 50, 150 can be implemented or used in a bearing assembly, such as assembly 10 in FIG. 1A or assembly 110 in FIG. 2A. Each bearing assembly 10, 110 includes an inner ring 20, 120, an outer ring 30, 130, and a plurality of rolling elements 40, 140 supported therebetween. The cages 50, 150 generally support and space the rolling elements 40, 150 from each other.

Figure 3:
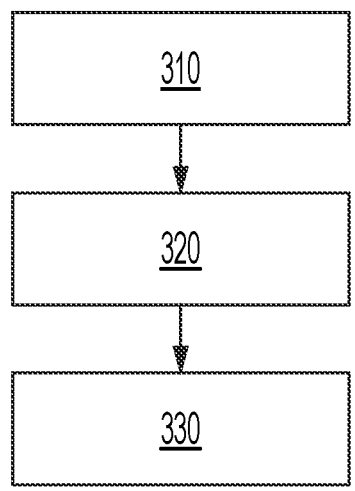
FIG. 3 is a flow chart illustrating method steps according to one embodiment.

As shown in FIG. 3, a method of formation for a bearing cage initially includes providing a bearing cage, which is illustrated as step 310. The bearing cage can be formed via various machining processes, such as machining, drilling, grinding, etc. The method includes forming the bearing cage from either titanium or a titanium alloy, as shown in step 320. In one aspect, the titanium alloy includes at least one of Ti-6Al-4V, Ti-5Al-2.5Sn, or Ti-10V-2Fe-3Al.

The method further includes applying a plasma-nitriding treatment to at least one surface of the bearing cage, as shown by step 330. In one aspect, the treatment is applied to a functional surface of the bearing cage, such as the cage pockets or a piloting diameter or surface. As used in this respect, the term functional surface means a surface immediately facing another part of the bearing assembly, such as a support or bearing surface.

The plasma-nitriding treatment is configured to form a compound layer of titanium nitride (TiN and $Ti_2N$) on an outer region of the at least one surface. This step can further form a diffusion zone adjacent to the outer region. In one aspect, the compound layer has a depth of at least 0.0015 mm, and the diffusion zone has a depth of at least 0.03 mm.

In one aspect, a Vickers hardness of the bearing cage at the outer region is at least 1000 HV. In another aspect, the Vickers hardness of the bearing cage at the outer region is at least 1300 HV. In another aspect, the Vickers hardness of the bearing cage at the outer region is at least 1800 HV.

In one aspect, the at least one surface of the bearing cage is configured to face or oppose a cage piloting surface of an adjacent bearing ring. The at least one surface can also be configured to support bearing elements of a bearing. In one aspect, any of the surfaces of the bearing cage configured to engage with an adjacent component, i.e. rolling elements, bearing rings, etc., can receive the plasma-nitriding treatment. In one aspect, the entire bearing cage receives the plasma-nitriding treatment. In another aspect, the bearing cage can be masked or otherwise covered such that only a portion of the bearing cage receives plasma-nitriding treatment. For example, fixtures for securing the bearing cage may result in voids or non-treated surfaces of the bearing cage.

Advantageous characteristics for the bearing cage include at least the avoidance of a sharp transition between an outer coating and the underlying body material of the bearing cage. The bearing cage disclosed herein also provides a weight reduction aspect as compared to existing bearing cages formed from steel. The present disclosure overcomes disadvantages of using regular, untreated titanium, which is known to have poor tribological properties. In one aspect, the bearing cage disclosed herein lacks any steel and is not formed from steel.

In one aspect, the bearing cage disclosed herein is configured for use in a turbofan, turboprop, or turboshaft engine. More specifically, the bearing cage can be used in a shaft assembly for these engines. Another possible application is in helicopter gearbox bearings. One of ordinary skill in the art would appreciate that bearing cages in these environments of use must be capable of withstanding a speed index of at least 1,000,000 mm/min. As used in this context, the speed index is the bearing pitch diameter in millimeters times the shaft speed in rpm. In one aspect, the bearing cage disclosed herein is configured to be used for operating temperatures of at least 120° C. One of ordinary skill in the art would recognize that the speed index for the bearing cage disclosed herein is at least twice the typical speed index for bearing cages used in automotive applications. Additionally, the operating temperature is at least 20% greater than a typical operating temperature experienced in automotive applications.

The present disclosure is directed to a method of forming a bearing cage, and also a bearing cage itself. In one aspect, the bearing cage includes a cage structure defining a plurality of rolling element pockets configured to support rolling elements. The bearing cage is formed from titanium or a titanium alloy, and at least one surface of the bearing cage is plasma-nitrided to form a compound layer of titanium nitride (TiN and $Ti_2N$) on an outer region of the at least one surface.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Bearing assembly 10, 110
Inner ring 20, 120
Outer ring 30, 130
Rolling elements 40, 140
Cage 50, 150

What is claimed is:

1. A method of forming a bearing cage, the method comprising:
    (i) forming a bearing cage from Ti-10V-2Fe-3Al;
    (ii) applying a plasma-nitriding treatment to at least one surface of the bearing cage to form a compound layer of titanium nitride including TiN and $Ti_2N$ on an outer region of the at least one surface, wherein a surface hardness at the outer region of the at least one surface is at least 1300 HV.

2. The method according to claim 1, wherein step (ii) further forms a diffusion zone adjacent to the outer region.

3. The method according to claim 2, wherein the compound layer has a depth of at least 0.0015 mm and the diffusion zone has a depth of at least 0.03 mm.

4. The method according to claim 1, wherein the surface hardness at the outer region of the at least one surface is at least 1800 HV.

5. The method according to claim 1, wherein the at least one surface of the bearing cage is a surface facing or opposing a cage piloting surface of an adjacent bearing ring.

6. The method according to claim 1, wherein the at least one surface includes a plurality of rolling element pockets configured to support bearing elements of a bearing.

7. The method according to claim 1, wherein the bearing cage includes a plurality of rolling element pockets configured to support spherical or cylindrical shaped rolling elements.

8. The method according to claim 1, wherein the bearing cage does not include steel.

9. A bearing cage comprising:
    a cage structure defining a plurality of rolling element pockets configured to support rolling elements,
    wherein the bearing cage is formed from Ti-10V-2Fe-3Al, and at least one surface of the bearing cage is plasma-nitrided to form a compound layer of titanium nitride including TiN and $Ti_2N$ on an outer region of the at least one surface, and
    wherein the bearing cage is used in a turbofan, turboprop, or turboshaft engine, or in a helicopter gearbox.

10. The bearing cage according to claim 9, wherein a diffusion zone is provided adjacent to the outer region.

11. The bearing cage according to claim 10, wherein the compound layer has a depth of at least 0.0015 mm and the diffusion zone has a depth of at least 0.03 mm.

12. The bearing cage according to claim 9, wherein a surface hardness of the bearing cage is at least 1000 HV.

13. The bearing cage according to claim 9, wherein the at least one surface of the bearing cage faces or opposes a cage piloting surface of an adjacent bearing ring.

14. The bearing cage according to claim 9, wherein the bearing cage is used at a speed index of at least 1,000,000 mm/min.

15. The bearing cage according to claim 9, wherein the bearing cage is used at temperatures of at least 120° C.

16. A method of forming a bearing cage, the method comprising:
    (i) forming a bearing cage from Ti-10V-2Fe-3Al; and
    (ii) applying a plasma-nitriding treatment to at least one surface of the bearing cage to form:
    a compound layer of titanium nitride including TiN and $Ti_2N$ on an outer region of the at least one surface, and
    a diffusion zone adjacent to the outer region;
    wherein the compound layer has a depth of at least 0.0015 mm and the diffusion zone has a depth of at least 0.03 mm.

* * * * *